US012265976B1

(12) United States Patent
Tiwari et al.

(10) Patent No.: US 12,265,976 B1
(45) Date of Patent: Apr. 1, 2025

(54) COMPUTER VISION IN-STORE PLANOGRAM ANALYSIS (71) Applicant: Blue Yonder Group, Inc., Scottsdale, AZ (US)

(72) Inventors: Mayank Tiwari, Telangana (IN); Ramakrishna Perla, Hyderabad (IN); Bharani Sarvepalli, Hyderabad (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 285 days.

(21) Appl. No.: 17/858,735

(22) Filed: Jul. 6, 2022

Related U.S. Application Data (60) Provisional application No. 63/219,091, filed on Jul. 7, 2021.

(51) Int. Cl.
*G06Q 30/0201* (2023.01)
*G06Q 30/0601* (2023.01)
(Continued)

(52) U.S. Cl.
CPC ..... *G06Q 30/0201* (2013.01); *G06Q 30/0639* (2013.01); *G06V 20/36* (2022.01); *G06V 20/52* (2022.01)

(58) Field of Classification Search
None
See application file for complete search history.

(56) References Cited

U.S. PATENT DOCUMENTS

| 2011/0035257 A1* | 2/2011 | Solanki | G06Q 10/043 |
| | | | 705/7.31 |
| 2014/0025420 A1* | 1/2014 | Joshi | G06Q 10/04 |
| | | | 705/7.23 |

(Continued)

FOREIGN PATENT DOCUMENTS

| WO | WO-03061366 A2 * | 7/2003 | G06K 17/00 |
| WO | WO-2011151477 A1 * | 12/2011 | G06K 9/3233 |

OTHER PUBLICATIONS

Austin "Business Essentials: Eye-Trackers to Test Your Company's Homepage", Aug. 2010, GazeHawk brings eye-tracking technology to the masses, pp. 1-11 (Year: 2010).*

(Continued)

*Primary Examiner* — Romain Jeanty
(74) *Attorney, Agent, or Firm* — Spencer Fane LLP; Steven J. Laureanti (57) ABSTRACT

A system and method are disclosed for computer vision in-store planogram analysis. The system includes a retail entity comprising a product display area defined by a planogram, and a planogram analyzer comprising a server which trains a machine learning model to generate recommendations to optimize one or more planogram metrics using historical data and computer vision data. The system generates, by the trained machine learning model, recommendations to optimize the one or more planogram metrics, and alters the planogram based on the one or more recommendations. The system further uses the trained machine learning model with a probabilistic optimization technique approximating a global optimum to generate the one or more recommendations to optimize the one or more planogram metrics. The computer vision includes one or more of eyeball movement, eyeball engagement and eyeball lingering time.

17 Claims, 5 Drawing Sheets (51) Int. Cl.
    *G06V 20/00*     (2022.01)
    *G06V 20/52*     (2022.01)

(56) References Cited

U.S. PATENT DOCUMENTS

| | | | |
|---|---|---|---|
| 2018/0218320 A1* | 8/2018 | Lee | G06K 17/0022 |
| 2019/0147463 A1* | 5/2019 | Karmakar | G06N 20/00 |
| | | | 705/7.31 |

OTHER PUBLICATIONS

Eric "Constraint-based design by cost function optimization", University of North Carolina at Chapel HillChapel Hill, NCUnited States , May 1991, pp. 1-189 (Year: 1992).*
Bai et al. "A New Model and a Hyper-heuristic Approach for Two-dimensional Shelf Space Allocation", 4OR-Q J Oper Res DOI 10.1007/s10288-012-0211-2 (2013): 31-55 (Year: 2013).

* cited by examiner

COMPUTER VISION IN-STORE PLANOGRAM ANALYSIS

CROSS REFERENCE TO RELATED APPLICATIONS

The present disclosure is related to that disclosed in the U.S. Provisional Application No. 63/219,091, filed Jul. 7, 2021, entitled "Computer Vision In-Store Planogram Analysis." U.S. Provisional Application No. 63/219,091 is assigned to the assignee of the present application. The present invention hereby claims priority under 35 U.S.C. § 119 (e) to U.S. Provisional Application No. 63/219,091.

TECHNICAL FIELD

The present disclosure relates generally to data processing, and specifically to analyzing retail planograms using computer vision data.

BACKGROUND

Planogram planning includes one or more actions associated with creating, communicating, executing, and verifying a planogram. A planogram comprises a representation of the arrangement of products on a shelf or other retail displays which, for example, are sent from a retail headquarters to be implemented at one or more retail stores and/or in one or more supply chains. Planogram generation may require significant time and human supervision, and may result in an inflexible planogram that is not easily modifiable in response to planned or unplanned changes to product dimensions. It may be difficult to ascertain (1) which products, product facings, and/or product displays within a particular planogram are contributing to converting shoppers into buyers, (2) which products within a planogram are attracting high or low quantities of customer attention, and/or (3) which products customers spend the most time with, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a planogram analysis system and method to identify hot/dark areas of one or more planograms, track the location effect of one or more products depending on the location of the one or more products within the shelf space of the planogram, and recommend product placements on the planogram shelves, based on computer vision data. Embodiments collect raw visual data and other data, including but not limited to product placement data, product attributes data, product sales history data, and planogram dimensions data. Embodiments use the data to train one or more machine learning models to generate recommendations for planogram product placement changes to maximize or minimize one or more planogram metrics. Embodiments use the one or more trained machine learning models to generate subsequent planogram recommendations.

Embodiments enable retailers and other supply chain entities to track the behavior of ghost shoppers and other retail customers, and to tailor planograms and product placements to observed behavior. Embodiments identify hot (highly travelled or viewed) and dark (less travelled or viewed) areas of stores and store shelves, and enable planners to measure the effectiveness of planograms and isolate underperforming products or product displays. Embodiments build shopper research data and determine what naturally draws proxy customers to make purchases, enabling the development of more effective and financially high-performing planograms. Embodiments allow users to base their retail and supply planning around shopper-centric features, such as the unconscious decision points shoppers make that are not easily recognizable in existing planogram systems. Embodiments use this shopper-centricity to improve planogram efficiency, both in use of space and number of sales made.

Figure 1:
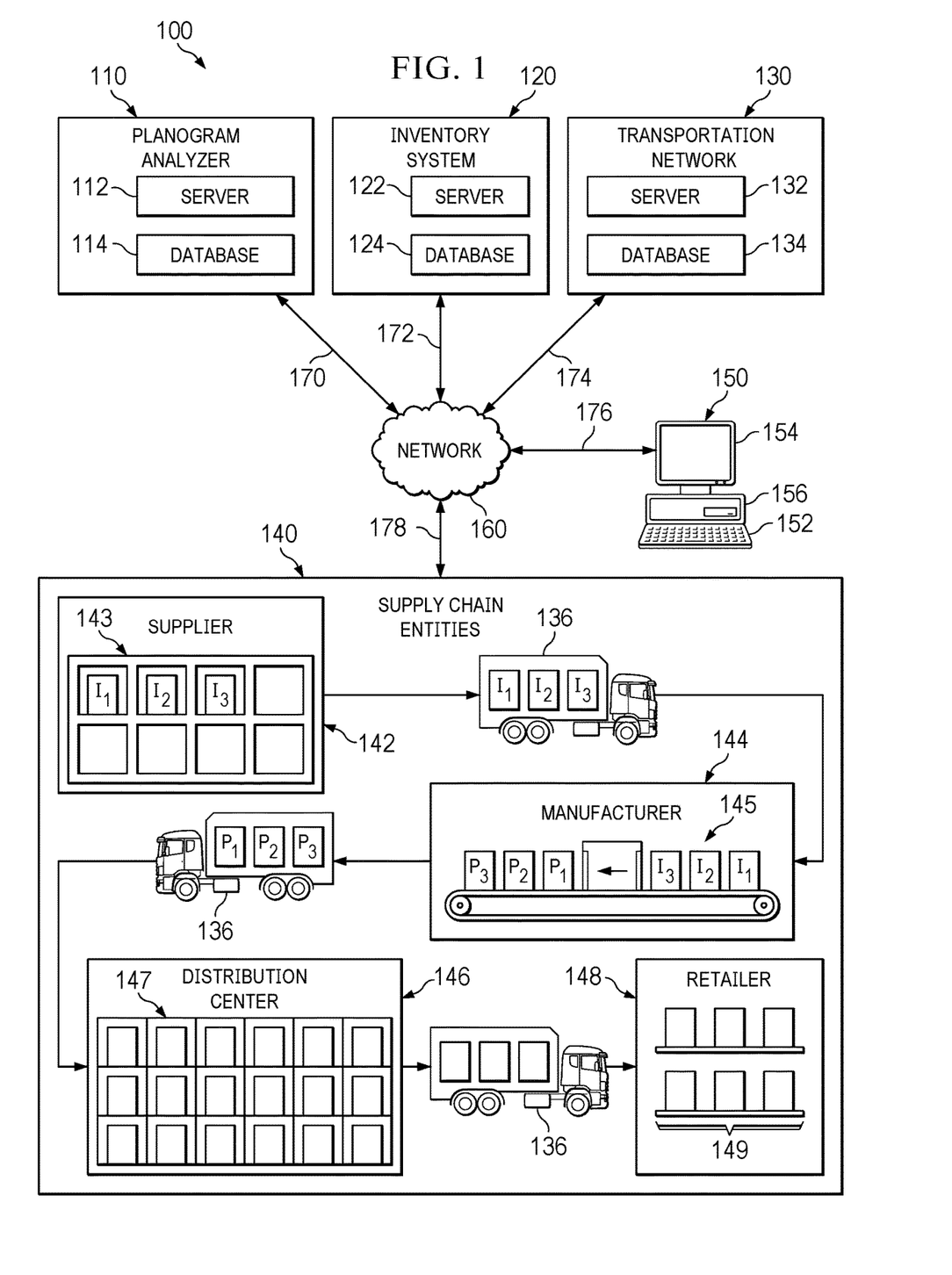
FIG. 1 illustrates an exemplary supply chain network, according to a first embodiment.

FIG. 1 illustrates an exemplary supply chain network 100 according to a first embodiment. Supply chain network 100 comprises planogram analyzer 110, inventory system 120, transportation network 130, one or more supply chain entities 140, computer 150, network 160, and communication links 170-178. Although a single planogram analyzer 110, inventory system 120, transportation network 130, one or more supply chain entities 140, a single computer 150, and a single network 160 are illustrated and described, embodiments contemplate any number of planogram analyzers 110, inventory systems 120, transportation networks 130, supply chain entities 140, computers 150, or networks 160, according to particular needs.

In one embodiment, planogram analyzer 110 comprises server 112 and database 114. As described in more detail below, server 112 comprises one or more modules to, for example, recommend product placements or planogram alterations using proxy and/or ghost customer behavior observed using computer vision. In embodiments, planogram analyzer 110 uses the observed customer behavior to train one or more machine learning models to output the recommendations.

Inventory system 120 comprises server 122 and database 124. Server 122 of inventory system 120 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100.

According to embodiments, database 124 includes current or projected inventory quantities or states, order rules, or explanatory variables. For example, database 124 may comprise the current level of inventory for each item at one or more stocking points across supply chain network 100. In addition, database 124 may comprise order rules that describe one or more rules or limits on setting an inventory policy, including, but not limited to, a minimum order quantity, a maximum order quantity, a discount, and a step-size order quantity, and batch quantity rules. According to some embodiments, database 124 may comprise explanatory variables that describe the data relating to specific past, current, or future indicators and the data of promotions, seasonality, special events (such as sporting events), weather, and the like. According to some embodiments, planogram analyzer 110 accesses and stores inventory data in database 124, which may be used by planogram analyzer 110 to generate one or more planograms, set inventory levels at one or more stocking points, initiate manufacturing of one or more components, or the like. In addition, or as an alternative, the inventory data of database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on the planograms and instruction sets generated by planogram analyzer 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with planogram analyzer 110, inventory system 120, transportation network 130, and/or one or more supply chain entities 140 to identify the location of transportation vehicle 136 and the location of any inventory or shipment located on transportation vehicle 136. In addition to the supply chain models, the number of items shipped by transportation vehicles 136 in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support planogram analyzer 110, inventory system 120, transportation network 130, and one or more supply chain entities 140. Supply chain network 100 comprising planogram analyzer 110, inventory system 120, transportation network 130, and one or more supply chain entities 140 may operate on one or more computers 150 that are integral to or separate from the hardware and/or software that support planogram analyzer 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to supply chain network 100.

Computer 150 may include one or more processors 156 and associated memory to execute instructions and manipulate information according to the operation of supply chain network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from planogram analyzer 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with planogram analyzer 110, inventory system 120, transportation network 130, and one or more supply chain entities 140.

These one or more users may include, for example, a "manager" or a "planner" handling generation of planograms and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, planogram planning, shelving resets, task management, communication and assignment of planograms and instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain networks 100, including one or more enterprises, such as, for example networks of one or more suppliers 142, manufacturers 144, distribution centers 146, retailers 148 (including brick and mortar and online stores), customers, and/or the like. Each of one or more supply chain entities 140 may comprise one or more cameras, depths sensors, infrared imaging devices, and/or other data-gathering components to capture images, depth data, and/or other data regarding one or more products and product dimensions delivered to each supply chain entity. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on planograms and instruction sets determined by planogram analyzer 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on planograms and instruction sets determined by planogram analyzer 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more planograms generated by planogram analyzer 110.

Retailers 148 may be any suitable entity that obtains one or more products to sell to one or more customers. Retailers 148 may comprise a corporate structure having a retail headquarters and one or more retail stores. Retail headquarters comprises a central planning office with oversight of one or more retail stores. Retailer stores may comprise any online or brick-and-mortar store, including stores with shelving systems 149. The one or more retail stores may sell products according to rules, strategies, orders, and/or guidelines developed by one or more retail headquarters. For example, retail headquarters may create planograms that determine how the store will shelve or display one or more products. Although planogram execution may be performed by a retail employee, embodiments contemplate automated configuration of shelving and retail displays. This may include, for example, automated robotic shelving machinery that places products on shelves or automated shelving that automatically adjusts based, at least in part, on the planograms. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are illustrated and described as separate and distinct entities, the same entity may simultaneously act as any one of one or more supply chain entities 140. For example, one or more supply chain entities 140 acting as a manufacturer can produce a product, and the same one or more supply chain entities 140 can act as a supplier to supply an item to itself or another one or more supply chain entities 140. Although one example of supply chain network 100 is illustrated and described in FIG. 1, embodiments contemplate any configuration of supply chain network 100, without departing from the scope described herein.

In one embodiment, each of planogram analyzer 110, inventory system 120, transportation network 130, computer 150, and supply chain entities 140 may be coupled with network 160 using communication links 170-178, which may be any wireline, wireless, or other link suitable to support data communications between planogram analyzer 110 and network 160 during operation of supply chain network 100. Although communication links 170-178 are shown as generally coupling planogram analyzer 110, inventory system 120, transportation network 130, one or more supply chain entities 140, and computer 150 to network 160, any of planogram analyzer 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling planogram analyzer 110, inventory system 120, transportation network 130, one or more supply chain entities 140, and computer 150. For example, data may be maintained locally to, or externally of, planogram analyzer 110, inventory system 120, transportation network 130, one or more supply chain entities 140, and computer 150 and made available to one or more associated users of planogram analyzer 110, inventory system 120, transportation network 130, one or more supply chain entities 140, and computer 150 using network 160 or in any other appropriate manner. For example, data may be maintained in a cloud database at one or more locations external to planogram analyzer 110, inventory system 120, transportation network 130, one or more supply chain entities 140, and computer 150 and made available to one or more associated users of planogram analyzer 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, planogram analyzer 110 may generate planograms and instruction sets for the inventory of one or more supply chain entities 140 in supply chain network 100. Furthermore, planogram analyzer 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more planograms and instruction sets, generated plans and policies and/or current inventory or production levels. When the inventory of an item falls to a reorder point, planogram analyzer 110 may then automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in database system associated with planogram analyzer 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in database system, where the first mapping is associated with the current location of the item. Computers 150 may also identify a second mapping in database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, at least in part, on one or more differences between the first mapping and the second mapping such as, for example, to locate an item to add to or remove from a shelf or an inventory of or shipment for one or more supply chain entities 140. In addition, or as an alternative, planogram analyzer 110 monitors the supply chain constraints of one or more items at one or more supply chain entities 140 and adjusts the orders and/or inventory of one or more supply chain entities 140 based on the supply chain constraints.

Figure 2:
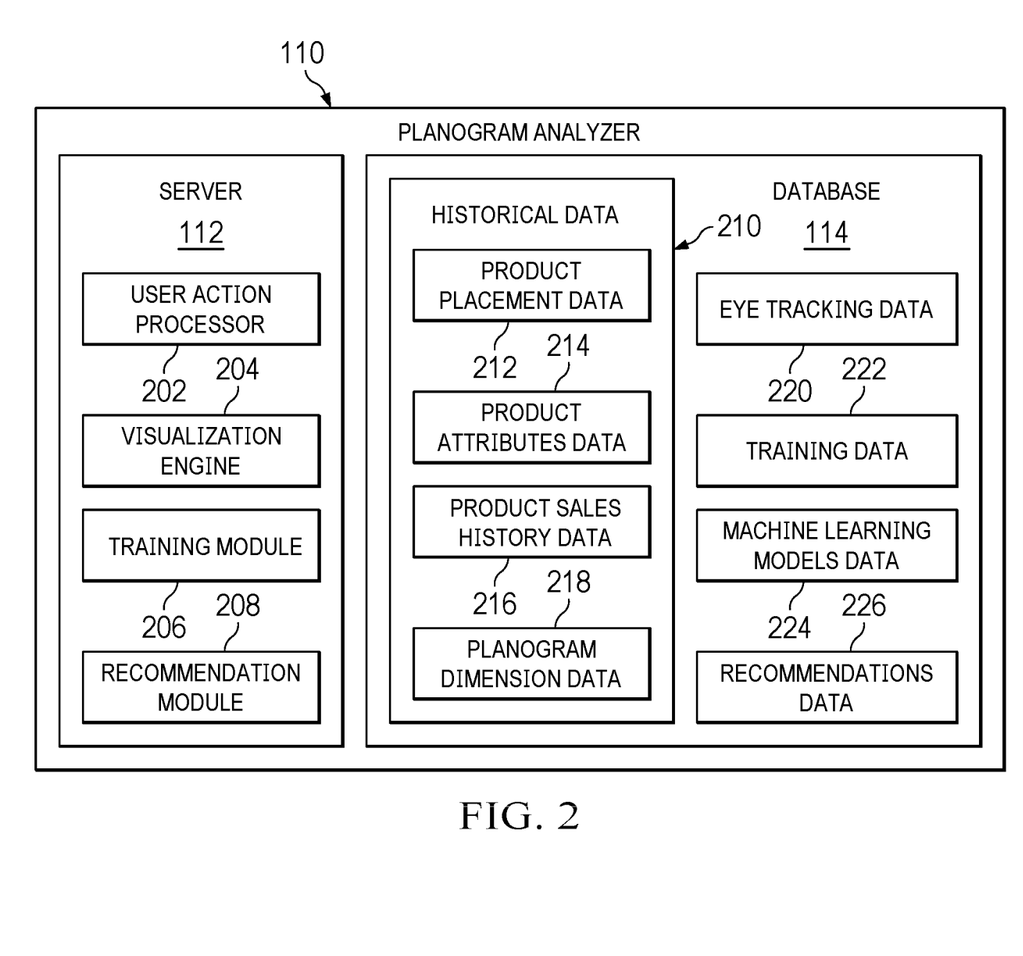
FIG. 2 illustrates the planogram analyzer of FIG. 1 in greater detail, in accordance with an embodiment.

FIG. 2 illustrates planogram analyzer 110 of FIG. 1 in greater detail in accordance with an embodiment. As discussed above, planogram analyzer 110 may comprise one or more computers 150 at one or more locations including associated input devices 152, output devices 154, non-transitory computer-readable storage media, processors 156, memory, or other components for receiving, processing, storing, and communicating information according to the operation of supply chain network 100. Additionally, planogram analyzer 110 comprises server 112 and database 114. Although planogram analyzer 110 is shown as comprising a single server 112 and a single database 114, embodiments contemplate any suitable number of computers 150, servers 112, or databases 114 internal to or externally coupled with planogram analyzer 110. According to some embodiments, planogram analyzer 110 may be located internal to one or more retailers 148 of one or more supply chain entities 140. In other embodiments, planogram analyzer 110 may be located external to one or more retailers 148 of one or more supply chain entities 140 and may be located in for example, a corporate retailer of the one or more retailers 148, according to particular needs.

Server 112 of planogram analyzer 110 may comprise user action processor 202, visualization engine 204, training module 206, and recommendation module 208. Although server 112 is illustrated and described as comprising a single user action processor 202, visualization engine 204, training module 206, and recommendation module 208, embodiments contemplate any suitable number or combination of these located at one or more locations, local to, or remote from planogram analyzer 110, such as on multiple servers 112 or computers 150 at any location in supply chain network 100.

User action processor 202 may receive and process user input, such as, for example, input received by the input device 152 of one or more computers 150, including but not limited to a keyboard or mouse. One or more computers 150 may transmit input to planogram analyzer 110 using one or more communication links 170-178. User action processor 202 may register the input from one or more computers 150 and transmit the input to visualization engine 204 and/or other planogram analyzer 110 modules to instigate or control module functions.

Visualization engine 204 generates one or more graphical user interface (GUI) displays for display on one or more computer monitors and/or other output devices 154. According to embodiments, visualization engine 204 may access database 114, including but not limited to historical data 210, product placement data 212, product attributes data 214, product sales history data 216, planogram dimension data 218, eye tracking data 220, training data 222, machine learning models data 224, and/or recommendations data 226, and may generate or more GUI displays to display the data. The one or more GUI displays may convey information, including planogram recommendations, product dimensions, sales data, KPI data, and/or any other type of information about supply chain network 100 and the ongoing sales of products sold throughout supply chain network 100. In an embodiment, visualization engine 204 may process input transmitted by user action processor 202, and, in response to the input, may generate one or more subsequent GUI displays that allow one or more computers 150 to interact with the GUI displays and to review different information displayed by visualization engine 204.

Training module 206 may train one or more machine learning models using eye tracking data 220 and historical data 210, including but not limited to product placement data 212, product attributes data 214, product sales history data 216, and planogram dimension data 218, as training data 222.

Recommendation module 208 may use one or more trained machine learning models to generate one or more recommendations, as described in greater detail below. In embodiments, recommendation module 208 uses the output from the one or more trained machine learning models to identify hot and dark areas of a retail location, or particular shelves within the retail location, and to determine the location effect for one or more products within the retail location.

Database 114 of planogram analyzer 110 may comprise one or more databases 114 or other data storage arrangements at one or more locations, local to, or remote from, server 112. Database 114 comprises, for example, historical data 210, including but not limited to product placement data 212, product attributes data 214, product sales history data 216, and planogram dimension data 218; eye tracking data 220; training data 222; machine learning models data 224; and/or recommendations data 226. Although database 114 is illustrated and described as comprising historical data 210, product placement data 212, product attributes data 214, product sales history data 216, planogram dimension data 218, eye tracking data 220, training data 222, machine learning models data 224, and recommendations data 226, embodiments contemplate any suitable number or combination of these, located at one or more locations, local to, or remote from, planogram analyzer 110 according to particular needs.

Historical data 210 comprises, for example, any data relating to past sales, past demand, purchase data, promotions, events, or the like of one or more products and/or one or more supply chain entities 140. Historical data 210 may be stored at time intervals such as, for example, by the minute, hour, daily, weekly, monthly, quarterly, yearly, or any suitable time interval, including substantially in real time.

Product placement data 212 may comprise placement data and category data for each of the products stored in product attributes data 214. Product categories may organize products into any number of separate or overlapping categories with one or more placement constraints. By way of example only and not by way of limitation, product placement data 212 may comprise, for a series of drink products, alcoholic and non-alcoholic categories, beer, wine, and spirits categories, perishable and nonperishable categories, and/or any other categories applicable to the products, along with placement requirements for each of the categories of products. Although particular product placement data 212 and categories are described, embodiment contemplate any product placement data 212 and categories, according to particular needs.

Product attributes data 214 may comprise product identifiers, item identifiers, attribute data (including, for example, brands, dimensions, product images, three-dimensional product representations, and the like), inventory levels, and other like data about one or more products, product hierarchies, substitutable products, target service levels, and the like. Product attributes data 214 may comprise (X,Y) locations of each and every product in the planogram with reference to a left-bottom corner.

Product sales history data 216 comprises data relating to the sales effects each product may have when displayed next to other products on one or more shelves. Product sales history data 216 may comprise, for example, space elasticity data for a particular product and a particular retail location, and/or the increases or decreases a particular product may have on other products displayed next to the product on a retail shelf. According to embodiments, product sales history data 216 may comprise any one or more general cost or sales price components of one or more items in supply chain network 100, such as, for example, holding costs, batch costs, stockout costs, inventory costs, order costs, backorder costs, and backlog costs, and/or sale prices for one or more items. Although particular product sales history data 216 are described, embodiment contemplate any type of product sales history data 216, according to particular needs.

Planogram dimension data 218 may comprise data relating to one or more planograms. According to some embodiments, planograms comprise, among other data, three-dimensional capacity data of each shelf along with the fixture dimensions and cubic capacity of overall available space, and images of products arranged in a similar layout that the products will appear on the shelves of a retail store. According to other embodiments, planograms comprise one or more digital formats that represent products and product placement as sequences of data structures that may be more easily transmitted and modified by modules or components of one or more of planogram analyzer 110, one or more computers 150, and/or one or more retailers 148, businesses, or supply chain entities 140 in supply chain network 100. Planogram dimension data 218 may comprise one or more existing and/or currently-active planograms that are in place at the one or more retail locations. In an embodiment, planogram dimension data 218 may include relevant key performance indicators (KPIs) and metrics by which planogram analyzer 110 measures the performance of one or more products and/or one or more categories that have been displayed at one or more retail locations according to one or more planograms.

Eye tracking data 220 may store one or more images, depth sensor data, and/or other data collected by one or more cameras, depth sensors, and/or other imaging devices, situated at one or more supply chain entities 140, regarding customer activity, including but not limited to ghost shopper activity and/or proxy customer activity, with regard to one or more planograms and products displayed in the planograms. By way of example only and not by way of limitation, eye tracking data 220 may comprise data collected by shelf-mounted imaging sensors at a supply chain retailer that track the eyeball movement, eyeball engagement, and eyeball lingering time of a ghost shopper as the ghost shopper views products displayed in a planogram. Eye tracking data 220 may comprise structured data, such as dwell time data, aligned to a particular product location in a planogram. Eye tracking data 220 may be collected by any form of sensors, including but not limited to virtual reality (VR) eye-tracking, shelf-edge cameras, Internet of Things (IoT) imaging devices, and/or any other form of sensor tracking any form of customer and/or shopper activity and engagement.

Training data 222 may comprise data used by training module 206 to train one or more machine learning models. In embodiments, training data 222 comprises a composite of data including product placement data 212, product attributes data 214, products sales history data 216, planogram dimension data 218 and eye tracking data 220. Training data 22 may be used to train various supervised learning machine learning models.

Machine learning models data 224 may store one or more machine learning models, including but not limited to one or more trained machine learning models. Machine learning models data 224 may comprise one or more supervised learning machine learning models, such as decision trees, n-nearest neighbor models, neural networks, and the like. The machine learning models stored in machine learning models 224 may be trained to output a set of recommendations for product placement within a planogram, or other alterations to an existing planogram.

Recommendations data 226 may comprise one or more recommendations generated by recommendation module 208 and one or more trained machine learning models stored in machine learning models data 224. As discussed in more detail below, the one or more recommendations may comprise a recommendation to change the placement within a planogram of one or more products, without altering the total space allotted within the planogram, therefore allowing for a more efficient use of the space of the planogram.

Figure 3:
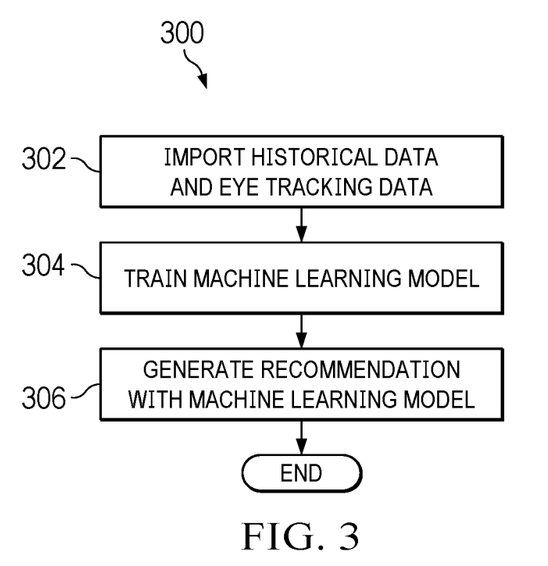
FIG. 3 illustrates an exemplary method of the planogram analyzer generating product placement recommendations using computer vision data, according to an embodiment.

FIG. 3 illustrates exemplary method 300 of planogram analyzer 110 generating product placement recommendations using computer vision data, according to an embodiment. Method 300 proceeds by one or more activities, which although described in a particular order may be performed in one or more permutations, combinations, orders, or repetitions, according to particular needs.

At activity 302, training module 206 imports historical data 210 and eye tracking data 220 into training data 222 of planogram analyzer 110 database 114. In an embodiment, training module 206 accesses historical data 210, which may include product attributes data 214, product attributes data 214, product sales history data 216, and planogram dimension data 218, and accesses eye tracking data 220. Training module 206 stores historical data 210 and eye tracking data 220 in training data 222 of planogram analyzer 110 database 114.

At activity 304, training module 206 trains one or more machine learning models, using training data 222, to generate recommendations. In an embodiment, training module 206 accesses one or more machine learning models stored in machine learning models data 224, and uses training data 222 to train the one or more machine learning models to generate recommendations for product placements in planograms according to one or more planogram metrics, and/or to quantify the location effects of one or more products within the planogram. Training module 206 may use the same training data 222 to train different machine learning models to generate different types of recommendations according to different planogram goals or metrics. For example, in an embodiment, training module 206 uses available training data 222 to train (1) a first machine learning model to identify hot and dark areas within a particular planogram stored in training data 222, (2) a second machine learning model to identify the location effect of particular products within the planogram, and (3) a third machine learning model to recommend altered product placements within the planogram to maximize profit without changing the total planogram space allocated to particular product categories. Having trained one or more machine learning models, training module 206 stores the one or more trained machine learning models in machine learning models data 224.

In an embodiment, training module 206 may use training data 222 to train a machine learning model to identify a location effect with a defined degree of specificity. Training data 222 in this embodiment may comprise product attributes data 214 such as product color, size, packaging, brand, discounts, and the shelf location of the product within the planogram. Eye tracking data 220 may include a dwell time-based location heat map, in which a customer's eye motion has been tracked and identified with computer vision as well as the dwell time with which the customer dwells on particular products in the planogram. In training the machine learning model, training module 206 may weigh the location effect and heat map in combination with product attributes and shelf location within the planogram, and may estimate the weights of attributes using a regression system with eye tracking data 220 as the target variable.

In the same or other embodiments, training module 206 may use a probabilistic optimization technique to approximate a global optimum while training one or more machine learning models. The model objective function may be to maximize the following demand function equation (1), provided below:

$$\text{Max}\left(\sum_{i=1}^{n}\sum_{j=1}^{s}x_{ij}L_{j}P_{i}(F_{i}^{ei})\right) \quad (1)$$

In an embodiment, $x_{ij}$ is 1 if i th product belongs to shelf j, $P_i$ is the price of the product, $L_j$ is the location effect of shelf j, and $F_i^{ei}$ is the space effect (the number of facings, powered by space elasticity). In this example, constraints may comprise (1) items in shelf must be less than or equal to shelf capacity, (2) same or similar SKU items should be displayed together, and (3) the minimum required facings must be less than or equal to the facings assigned to an item, and the facings assigned to an item must be less than or equal to the maximum required facings allowed per item.

In an embodiment, training module 206 may train one or more machine learning models to make recommendations using a location effect described by equation (2):

$$L = \sum_{k=1}^{n}w_{k}A_{k} \quad (2)$$

In this embodiment, the location effect is a weighted combination of product attributes $A_k$ and shelf location within the planogram. Training module 206 may estimate weights of attributes using linear regression with eye tracking data 220 as a target variable.

At activity 306, recommendation module 208 generates one or more recommendations. In an embodiment, recommendation module 208 accesses the one or more trained machine learning models stored in machine learning models data 224. Recommendation module 208 applies historical data 210 and eye tracking data 220 to the one or more trained machine learning models to generate one or more recommendations. According to embodiments, recommendations may comprise any form of alterations to one or more planograms or one or more products displayed according to one or more planograms, including but not limited to increasing or decreasing shelf space allocated to one or more products, grouping specified products together or separating specified products, or making any other alterations, to maximize or minimize one or more planogram metrics, including but not limited to profitability per square shelf space foot or minimum/maximum eye tracking dwell time. Recommendation module 208 stores the one or more recommendations in recommendations data 226, and terminates method 300.

Figure 4:
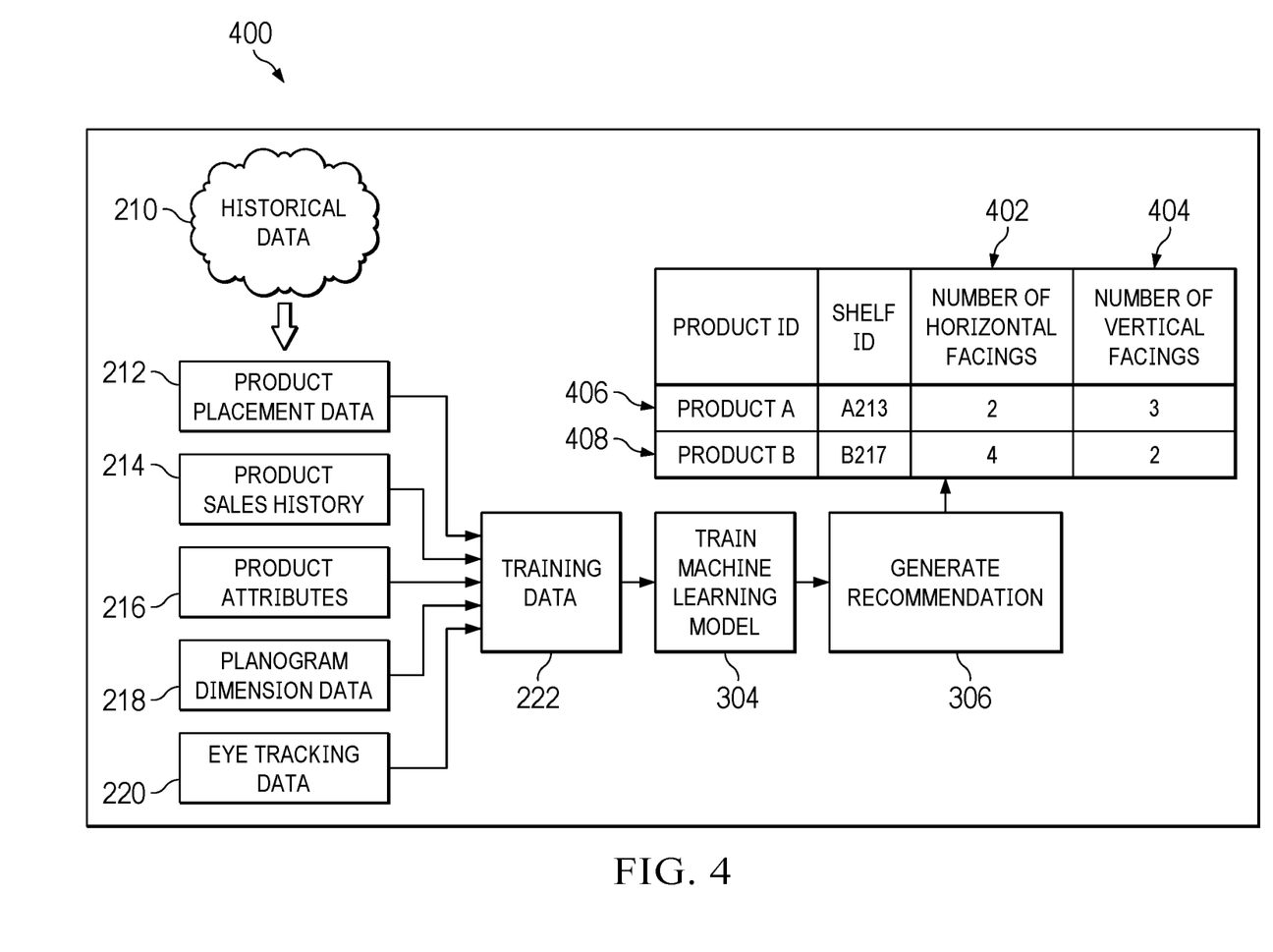
FIG. 4 illustrates a recommendations graphical user interface display, according to an embodiment.

To illustrate planogram analyzer 110 executing activities of method 300 to generate product placement recommendations using computer vision data, the following example is provided. In this example, planogram analyzer 110 trains a machine learning model to maximize profitability associated with the sales of two products (in this example, "Product A 406 and Product B 408") within a planogram by recommending a particular number of horizontal facings 402 and vertical facings 404 for each of Product A 406 and Product B 408. Although the following example illustrates planogram analyzer 110 executing activities of method 300 and generating particular recommendations for two products, embodiments contemplate planogram analyzer 110 using computer vision data to generate any type of recommendations for any number of products, according to particular needs.

In this example, at activity 302, training module 206 imports historical data 210 and eye tracking data 220 into training data 222 of planogram analyzer 110 database 114. In this example, training module 206 accesses historical data 210, which includes product attributes data 214, product attributes data 214, product sales history data 216, and planogram dimension data 218 for each of Product A 406 and Product B 408, and accesses eye tracking data 220. In this example, eye tracking data 220 comprises computer vision data recorded at a proxy retailer regarding a dwell time-based location heat map, in which proxy customers' eye motions with respect to each of Product A 406 and Product B 408 were identified and recorded using computer vision techniques. Training module 206 stores historical data 210 and eye tracking data 220 in training data 222 of planogram analyzer 110 database 114.

Continuing the example, at activity 304, training module 206 trains one or more machine learning models, using training data 222, to generate recommendations to maximize profitability associated with the sales of each of Product A 406 and Product B 408. In an embodiment, training module 206 uses training data 222 to train a machine learning model (henceforth, the "Product A/B Model") to generate recommendations for the placement of Product A 406 and Product B 408 in planograms in order to maximize profitability associated with the sales of each of Product A 406 and Product B 408. Having trained the Product A/B model using training data 222, training module 206 stores the Product A/B Model in machine learning models data 224.

Continuing the example, at activity 306, recommendation module 208 generates recommendations using the Product A/B Model. In an embodiment, recommendation module 208 accesses the Product A/B Model stored in machine learning models data 224. Recommendation module 208 applies historical data 210 and eye tracking data 220 to the Product A/B Model to generate recommendations to maximize profitability associated with the sales of each of Product A 406 and Product B 408. In this example, the Product A/B Model recommends 2 horizontal facings 402 and 3 vertical facings 404 for Product A 406, and 4 horizontal facings 402 and 2 vertical facings 404 for Product B 408. Recommendation module 208 stores the recommendations in recommendations data 226. In this example, visualization engine 204 accesses recommendations data 226, and generates recommendations GUI display 400, illustrated by FIG. 4, to display the recommendations. Planogram analyzer 110 then terminates method 300.

FIG. 4 illustrates recommendations GUI display 400, according to an embodiment. In an embodiment, recommendations GUI display 400 may display recommendations generated by recommendation module 208 (in the example illustrated by FIG. 4, recommended horizontal facings 402 and vertical facings 404 for each of Product A 406 and Product B 408, described above). According to embodiments, recommendations GUI display 400 may also display an information flow diagram to display the flow of information through planogram analyzer 110 as planogram analyzer 110 executes the activities of method 300. Although FIG. 4 illustrates recommendations GUI display 400 in a particular configuration, embodiments contemplate visualization engine 204 generating recommendations GUI displays 400 in any configuration and displaying any data stored in planogram analyzer 110 database 114, according to particular needs.

Figure 5:
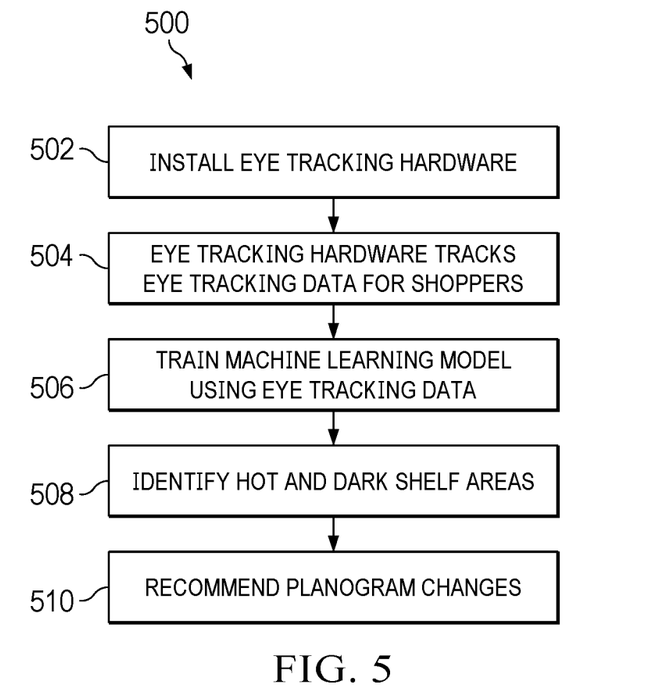
FIG. 5 illustrates an exemplary method of using eye tracking data to recommend planogram changes based on a hot and dark area analysis, according to an embodiment.

FIG. 5 illustrates exemplary method 500 of using eye tracking data to recommend planogram changes based on a hot and dark area analysis, according to an embodiment. Method 500 proceeds by one or more activities 502-512, which although described in a particular order may be performed in one or more permutations, combinations, orders, or repetitions, according to particular needs.

At first activity 502, eye tracking hardware is installed within a retail location. As discussed above in more detail with respect to FIG. 2, eye tracking hardware may include shelf-mounted imaging sensors, shelf-edge cameras, IoT imaging devices or any other sensors capable of tracking the eyeball movement, eyeball engagement, and eyeball lingering time of a shopper. In the case of a virtual or simulated retail location, eye tracking hardware may comprise a VR headset configured to record the eye movements of a wearer.

At second activity 504, the eye tracking hardware tracks eye tracking data for one or more shoppers at the retail location. In embodiments, the one or more shoppers may be surrogate shoppers, sometimes called ghost shoppers, used by a retailer to determine the shopping habits of a customers within the retail location. In such embodiments, the eye tracking hardware differentiates between ghost shoppers and other shoppers, and only records the eye tracking data for ghost shoppers, while ignoring the eye movements and other shopping behaviors of the other shoppers.

At third activity 506, one or more machine learning models are trained using the eye tracking data collected at second activity 504. The one or more machine learning models may be trained using method 300 described with respect to FIG. 3. In embodiments, the one or more machine learning models may be trained using the eye tracking data as well as historical and planogram data for the retail location.

At fourth activity 508, output from the one or more machine learning models trained at third activity 506 is analyzed to identify hot and dark shelf areas within the retail location. In an embodiment, the hot and dark areas are determined, not at a store level, but with respect to a particular shelf. For example, a hot area within a shelf may correspond to a location that tended to, according to the eye tracking data, be the first place that shoppers looked on a particular shelf, the area on the shelf that shoppers spent the most time looking at, or the area on the shelf that shoppers on which shopper attention tended to persist. On the other hand, a dark area within a shelf may correspond to a location that tended to, according to the eye tracking data, be overlooked or ignored by the shoppers.

At fifth activity 510, one or more recommendations to change the planogram active within the retail location are made, based on the hot and dark area analysis performed at fourth activity 508. For example, one possible recommendation may be to move an underperforming or over-stocked item to a hot area within the shelf, so that the underperforming or over-stocked item is likely to be viewed more often. Other possible recommendations may be to be break up high-selling items to avoid overly large hot areas or dark areas.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been illustrated and described, it will be understood that various changes and modifications to the foregoing embodiments may become apparent to those skilled in the art without departing from the spirit and scope of the present invention.

What is claimed is:

1. A system, comprising:
a retail entity comprising a product display area defined by a planogram;
eye tracking hardware configured to track eye tracking data for one or more shoppers at the product display area; and
a planogram analyzer comprising a server and configured to:
train a machine learning model to generate recommendations to optimize one or more planogram metrics using real time historical data and computer vision data;
generate, using the trained machine learning model with a probabilistic optimization technique approximating a global optimum, one or more recommendations to optimize the one or more planogram metrics; and
alter the planogram based on the one or more recommendations.

2. The system of claim 1, wherein the computer vision data comprises spatial location heat map data tracking one or more customers' eye motion and gaze dwell time.

3. The system of claim 1, wherein the real time historical data for the machine learning model comprises:
eye tracking data.

4. The system of claim 1, wherein the computer vision data comprises one or more of:
eyeball movement, eyeball engagement and eyeball lingering time.

5. The system of claim 1, wherein the computer vision comprises one or more of:
virtual reality eye tracking, shelf-edge cameras or internet-of-things imaging devices.

6. The system of claim 1, wherein the recommendations comprise one or more of:
increasing or decreasing shelf space allocated to one or more products, grouping specified products together or separating specified products, or making alterations that maximize or minimize planogram metrics.

7. A computer implemented method, comprising:
providing eye tracking hardware configured to track eye tracking data for one or more shoppers at a product display area;
training, by a planogram analyzer comprising a server, a machine learning model to generate recommendations to optimize one or more planogram metrics using real time historical data and computer vision data;
generating, by the planogram analyzer, using the trained machine learning model with a probabilistic optimization technique approximating a global optimum, one or more recommendations to optimize the one or more planogram metrics; and
altering, by the planogram analyzer, the planogram based on the one or more recommendations.

8. The computer-implemented method of claim 7, wherein the computer vision data comprises spatial location heat map data tracking one or more customers' eye motion and gaze dwell time.

9. The computer-implemented method of claim 7, wherein the real time historical data for the machine learning model comprises:
eye tracking data.

10. The computer-implemented method of claim 7, wherein the computer vision data comprises one or more of:
eyeball movement, eyeball engagement and eyeball lingering time.

11. The computer-implemented method of claim 7, wherein the computer vision comprises one or more of:
virtual reality eye tracking, shelf-edge cameras or internet-of-things imaging devices.

12. The computer-implemented method of claim 7, wherein the recommendations comprise one or more of:
increasing or decreasing shelf space allocated to one or more products, grouping specified products together or separating specified products, or making alterations that maximize or minimize planogram metrics.

13. A non-transitory computer-readable storage medium embodied with software, the software when executed by a server is configured to:
track, using eye tracking hardware, eye tracking data for one or more shoppers at a product display area;
train a machine learning model to generate recommendations to optimize one or more planogram metrics using real time historical data and computer vision data;
generate, using the trained machine learning model with a probabilistic optimization technique approximating a global optimum, one or more recommendations to optimize the one or more planogram metrics; and
alter the planogram based on the one or more recommendations.

14. The non-transitory computer-readable storage medium of claim 13, wherein the computer vision data comprises spatial location heat map data tracking one or more customers' eye motion and gaze dwell time.

15. The non-transitory computer-readable storage medium of claim 13, wherein the historical data for the machine learning model comprises:
eye tracking data.

16. The non-transitory computer-readable storage medium of claim 13, wherein the computer vision data comprises one or more of:
eyeball movement, eyeball engagement and eyeball lingering time.

17. The non-transitory computer-readable storage medium of claim 13, wherein the recommendations comprise one or more of:
increasing or decreasing shelf space allocated to one or more products, grouping specified products together or separating specified products, or making alterations that maximize or minimize planogram metrics.

* * * * *